United States Patent [19]

Strauch et al.

[11] Patent Number: 5,278,587
[45] Date of Patent: Jan. 11, 1994

[54] METHOD AND APPARATUS FOR IMAGE REGISTRATION

[75] Inventors: Andrew M. Strauch, Rochester; Daniel W. Costanza, Webster; Kenneth R. Ossman, Macedon; Fred F. Hubble, III, Rochester, all of N.Y.

[73] Assignee: Xerox Corporation, Stamford, Conn.

[21] Appl. No.: 970,889

[22] Filed: Nov. 3, 1992

[51] Int. Cl.$^5$ .................. G03G 15/01; G03G 21/00; G01D 15/14
[52] U.S. Cl. .................. 346/157; 346/160; 355/208; 355/327
[58] Field of Search .................. 346/157, 160; 355/208, 355/327

[56] References Cited

U.S. PATENT DOCUMENTS

| | | | |
|---|---|---|---|
| 4,289,371 | 9/1981 | Kramer | 350/3.71 |
| 4,611,901 | 9/1986 | Kohyama et al. | 355/4 |
| 4,660,059 | 4/1987 | O'Brien | 346/157 |
| 4,833,503 | 5/1989 | Snelling | 355/259 |
| 5,175,570 | 12/1992 | Haneda et al. | 346/160 |
| 5,189,477 | 2/1993 | Leys et al. | 355/327 X |
| 5,200,791 | 4/1993 | Dastin et al. | 355/326 |
| 5,208,633 | 5/1993 | Genovese | 355/208 X |

*Primary Examiner*—George H. Miller, Jr.

[57] ABSTRACT

The present invention is directed to a precise method of registering plurality of imaging stations, so as to form sequential images on a photoreceptor belt in a single pass. A belt hole is formed in the photoreceptor belt, outside the image area, but within the scan of the imager scan line. The scan line is sequentially swept in a transverse direction across the width of the belt. As the leading edge of the belt hole advances into the sweeping beam, a plurality of beam sweeps will occur while the leading edge is moving through the sweep area. Due to the gaussian illumination of the scanning beam, the exposure at the belt edge gradually increases to a maximum point coinciding with the maximum illumination of the scanning beam. A detector is placed beneath the belt to provide a signal representing the exposure level of each scanning beam which crosses the leading edge of the advancing belt hole. The detectors produce a current output representative of the exposure level. The current output is converted into voltage outputs which are then used in an extrapolation process to determine a midpoint for the illumination profile crossing the scan line and, from this, a reference time at which the midpoint of the beam illumination was reached. This reference time is then used to generate a precisely timed line sync signal which is reproducible through each of the imaging stations to produce registration of the first scan line of each image sequence with a very high degree of accuracy.

5 Claims, 5 Drawing Sheets

METHOD AND APPARATUS FOR IMAGE REGISTRATION

BACKGROUND OF THE INVENTION

The present invention relates to registration of plural image exposures formed on a photoreceptor belt by a plurality of Raster Output Scanning (ROS) systems and, more particularly, to a method and apparatus for forming registered color images on the belt in a single pass.

In single pass electrophotographic printers having more than one process station which provide sequential images to form a composite image, critical control of the registration of each of the sequenced images is required. Failure to achieve registration of the images yields printed copies in which the images are misaligned. This condition is generally obvious upon viewing of the copy, as such copies usually exhibit fuzzy color separations, bleeding and/or other errors which make such copies unsuitable for intended uses. A simple, relatively inexpensive, and accurate approach to register latent images superposed in such printing systems has been a goal in the design, manufacture and use of electrophotographic printers. This need has been particularly recognized in the color and highlight color portion of electrophotography. The need to provide accurate and inexpensive registration has become more acute, as the demand for high quality, relatively inexpensive color images has increased.

The present invention is directed towards a single pass, color xerographic system, in which a plurality of ROS stations are positioned adjacent to a photoreceptor surface and selectively energized to create successive image exposures, one for each of the three basic colors. A fourth ROS station is added if black images are to be created as well. Thus, each image area on the photoreceptor surface must make at least three passes relative to the transverse scan lines formed by a modulated laser beam generated by the ROS system. Each image is formed by a series of horizontal scan lines with each line having a certain number of pixels per inch. Each image must be registered to within a 0.1 mm circle or within a tolerance of ±0.05 mm. Each color image must be registered in both the photoreceptor process direction (process registration) and in the direction parallel to the process direction (referred to as the fast scan or transverse registration).

The present invention is directed towards a method and apparatus for determining the position of the ROS scanning beam relative to the photoreceptor in the process direction. The relative location is measured using a pair of transversely aligned belt holes, each hole having an associated light detector. As the belt advances into the path of the transversely swept ROS beam, a series of measurements are made as the ROS beam crosses the leading edge of the hole. By collecting the successive signal outputs of the detector, an extrapolation is made which identifies, with a very high degree of accuracy, the exact time that the midpoint of the gaussian-shaped ROS beam is at the lead edge of the belt hole. Process and skew direction adjustments can then be made to each ROS.

More particularly, the present invention is directed towards an electrophotographic printer of the type having a photoreceptor surface mounted for movement in the process direction, the printer including:

a plurality of imagers for sequentially scanning and exposing image areas with a scanning beam to form a composite color image thereon, a photoreceptor belt mounted for movement in the process direction, said belt having formed therein at least one belt hole having a leading edge which advances with the belt in the process direction, detecting means associated with each imager for generating a series of increasing output signals up to a maximum, which correspond to the maximum illumination distribution of the scan beam, each signal produced by a separate scan beam crossing the leading edge of the hole, and circuit means for interpolating the detector output signals to determine the time that the ROS beam is at midpoint exposure level at the hole leading edge and for generating a line sync signal based on this reference time.

DETAILED DESCRIPTION OF THE INVENTION

Figure 1:
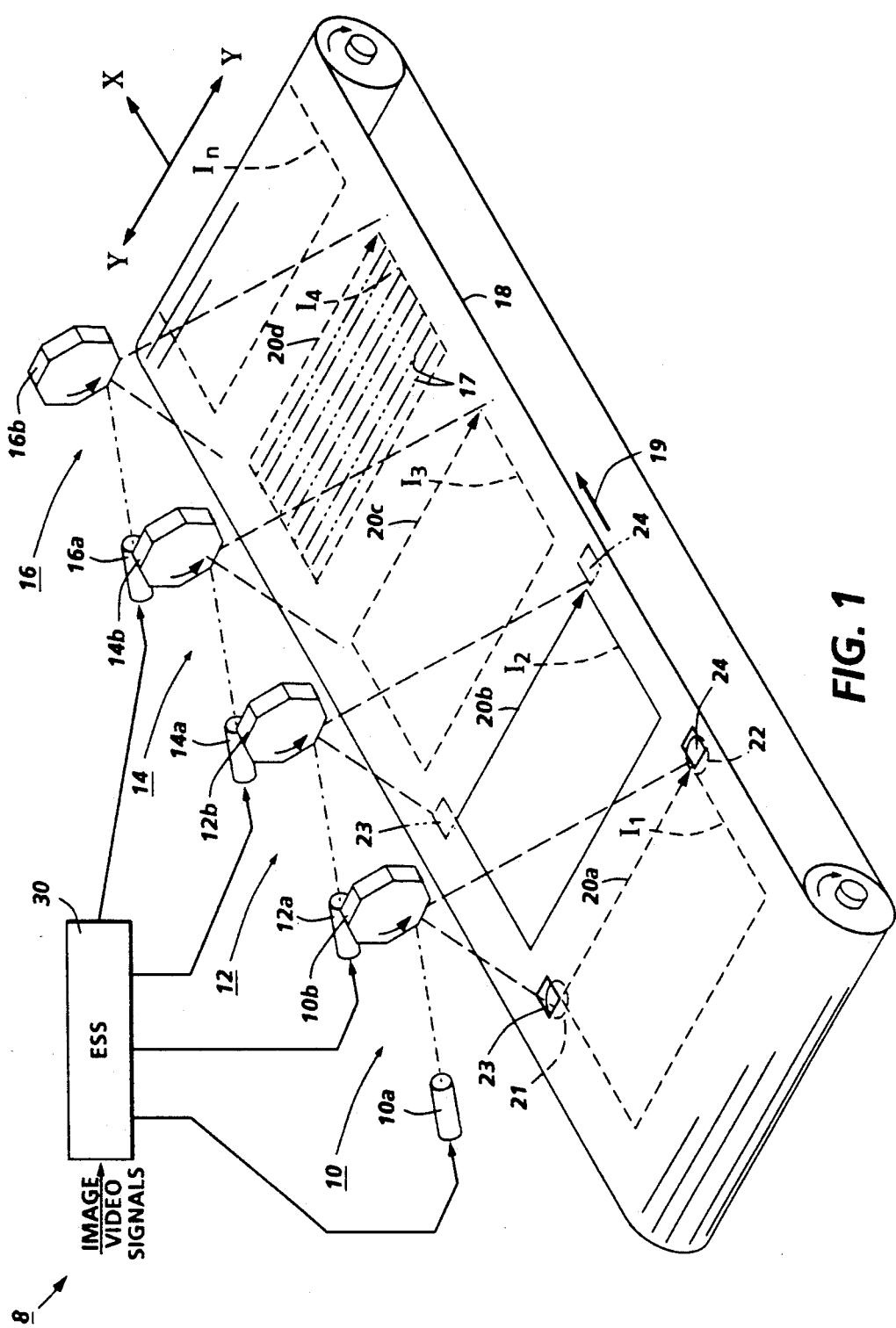
FIG. 1 is a schematic perspective view of a single pass, multiple ROS system adapted to form registered color images in accordance with the principles of the present invention.

For a general understanding of the features of the present invention, reference numerals have been used throughout to designate identical elements. FIG. 1 schematically depicts the various elements of an illustrative color electrophotographic printing machine incorporating the method of the present invention therein. It will become evident from the following discussion that this method is equally well suited for use in a wide variety of printing machines and is not necessarily limited in its application to the particular embodiments depicted herein.

Figure 4:
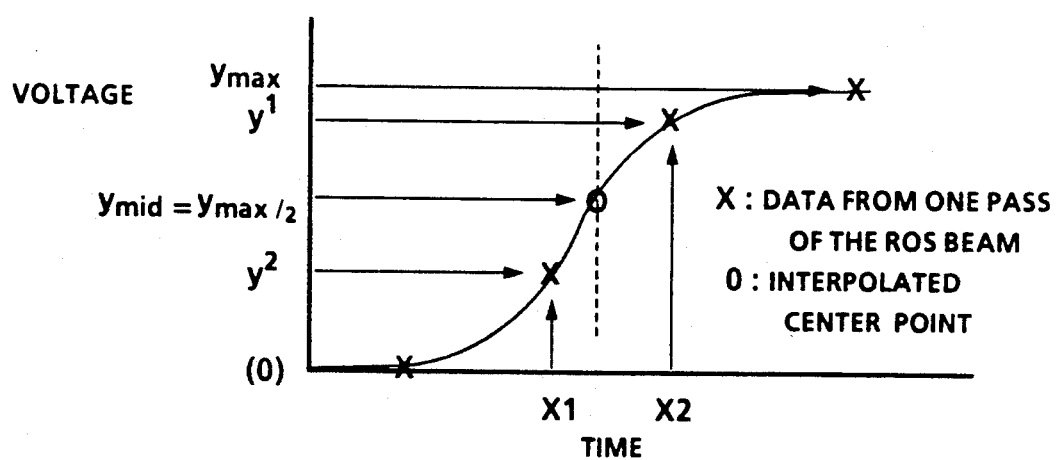
FIG. 4 is a plot of the exposure levels of multiple passes of the ROS beam across the advancing hole edge versus time.

Inasmuch as the art of electrophotographic printing is well know, the various processing stations employed in the FIG. 4 printing machine will be shown hereinafter schematically and their operation described briefly with reference thereto.

FIG. 1 shows a single pass, ROS color printing system 8 having four ROS systems, 10, 12, 14, and 16. The system 8 includes a photoreceptor belt 18, driven in the process direction, indicated by the arrow 19. The length of the belt 18 is designed to accept an integral number of spaced image areas $I_1-I_n$ represented by dashed line rectangles in FIG. 1. Image areas $I_1-I_4$ comprise an image frame; it is understood additional image frames, each associated with a process color image may be formed during one belt rotation. Upstream of each of the image areas $I_1-I_4$ is a charging station (not shown)

which places a predetermined electrical charge on the surface of belt 18. As each of the image areas $I_1$-$I_4$ reaches a transverse start-of-scan line, represented by lines 20a-20d, the area is progressively exposed on closely spaced transverse raster lines 17, shown with exaggerated longitudinal spacing on the image area $I_4$. Each image area $I_1$-$I_4$ is exposed successively by ROS systems 10, 12, 14, 16. Each ROS system has a start-of-scan (SOS) sensor and an end-of-scan (EOS) sensor, not shown, but conventional in the art. Each system also has a pair of photodetectors positioned beneath the belt, but in alignment with the ends of the scan beam. Only one pair of detectors, 21, 22, is shown. However, each ROS system would have its own detector pair. Belt holes 23, 24, are formed in belt 18 for image registration purposes described in detail below.

Downstream from each ROS system, a development station (not shown) develops the latent image formed in the preceding image area. A fully developed color image is then transferred to an output sheet. Details of charge and development xerographic stations in a multiple exposure single pass system are disclosed, for example, in U.S. Pat. Nos. 4,660,059, 4,833,503 and 4,611,901, whose contents are hereby incorporated by reference. The charge, development, and transfer stations are conventional in the art. Each ROS system contains its own conventional scanning components, of which only two, the laser light source and the rotating polygon, are shown. The particular system 10 has a gas, or preferably, laser diode 10a, whose output is modulated by signals from ESS 30 and optically processed as a focused line on the facets of rotating polygon 10b. Each facet reflects the modulated incident laser beam as a scan line, which is focused in the linear direction at the photoreceptor surface. ESS 30 contains the circuit and logic modules which respond to image video signals and other control and timing signals to operate the photoreceptor drive synchronously with the image exposure and to control the rotation of the polygon 10b by a motor (not shown). The other ROS systems 12, 14, 16, have their own associated laser diodes 12a, 14a, 16a, and polygons 12b, 14b, 16b, respectively.

Figure 3:
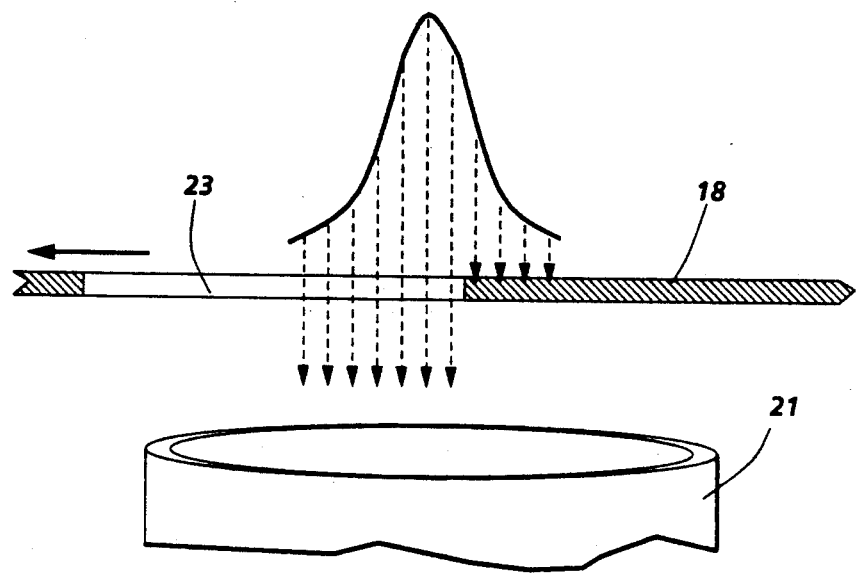
FIG. 3 shows the gaussian distribution of the ROS scanning beam as it sweeps across the leading edge of the advancing belt hole.

In a single pass, full color operation, the belt moves in the process direction bringing belt holes 23, 24, into the path of the scanning beams, traversing the belt after reflection from polygon 10b. The accuracy of the skew adjustment using outputs of detectors 21 and 22 and generation of line sync signals to form start-of-image line 20a (and successively, 20b, 20c, 20d) depends upon the accuracy of the detection of the leading edge of hole 23. The present invention provides a technique for determining the coincidence of the center of the gaussian distribution of the ROS beam sweeping across the leading edge as it advances. This determination is provided with a high degree of accuracy measured in microns. Each sweep, or scan, of the ROS beam is accomplished in intervals of 100-400 nsec. In order to produce consistent shades, the photoreceptor traverses a distance of one full-width half-max (FWHM) each scan of the ROS beam. One FWHM corresponds to about 1.2 sigma, where sigma is the standard deviation of the ROS beam gaussian distribution. A representative gaussian distribution is shown in FIG. 3.

Figure 2:
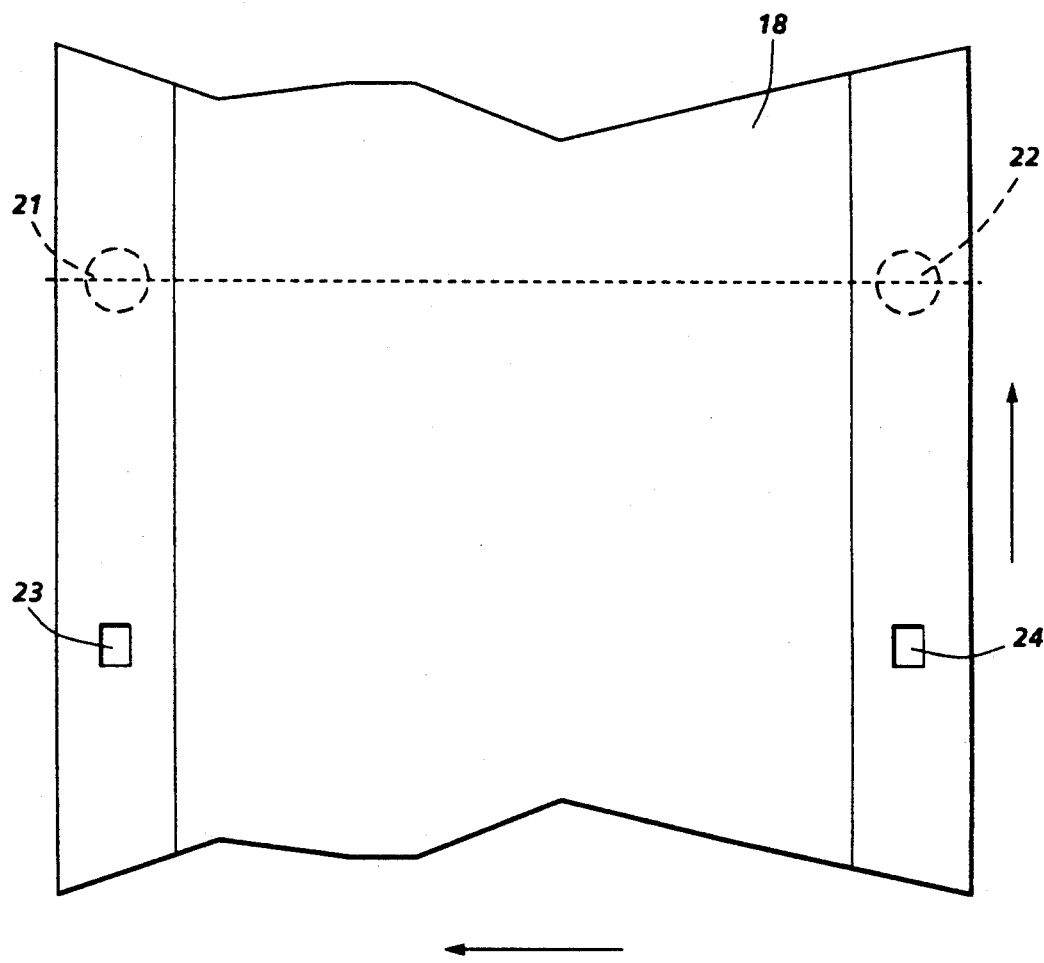
FIG. 2 is a partial top view of the belt shown in FIG. 1, illustrating a pair of belt holes approaching a ROS imaging station.

Turning now to FIG. 2, FIG. 2 is a top partial view of the belt 18, with holes 23-24 approaching the ROS beam generated by ROS system 12 and shows the location of detectors 21 and 22. FIG. 3 depicts, and in enlarged detail, the passage of leading edge of hole 23 into the scan line 20a (the ROS beam is scanning into the page). Because of the gaussian distribution of the ROS scanning beam, the first scan line produces a first minimum exposure at photodetector 21. A second scan line, one FWHM later, produces a second, higher exposure level. A third and fourth scan produces progressively higher exposure levels as the full Gaussian profile crosses the leading edge of the hole. Because of the motion of the photoreceptor between scan lines, only four scans at this scanning rate can be taken, but this is enough to provide four detector 21 outputs, or data points, as shown in FIG. 4. These data points, as well as the four data points obtained from detector 22 outputs, arrived at in a similar fashion, can be analyzed as described below, to arrive at an interpolated center point of the gaussian distribution. This center point corresponds to the time that the midpoint of the ROS beam time is at the leading edge of hole 23 and 24. By knowing the center point at both sides of the photoreceptor, a skew adjustment can be made by conventional means, such as adjusting an optical element in the ROS optical system, to change the angle of the reflected beam 20a. The adjustment is made by comparing the center point time of the beams crossing holes 23 and 24 and adjusting the optical component until the center point time is coincident. The remaining ROS systems are then adjusted in similar fashion.

To continue with the operational sequence, once skew adjustment has been achieved, and referring again to FIG. 1, a full color image can be formed by exposing sequentially image areas $I_1$-$I_4$. As belt holes 23, 24 advances in the process direction, the ROS beam from each system will cross the leading edges of the belt holes. The center of each beam is determined, as described above, and a line sync signal generated, and sent to ESS 30, which will initiate the first scan lines 20a, 20b, 20c, 20d, for each image area following some predetermined time interval. Successive scan lines are laid down to form the first color image. This image is developed and the belt surface recharged, prior to entering ROS system 12. In the lead edge of belt hole 23 (shown dotted) is detected and line 20b is formed registered with previously formed line 20a. The second color image is formed and developed. This process is repeated twice more at ROS systems 14 and 16, following which the complete color image is transferred at a transfer station (not shown), but conventional in the art. It is understood that additional frames, each with a belt hole, can be advancing from a position on the belt downstream from the belt hole position shown in FIG. 1. These belt holes would operate in the same manner as belt holes 23, 24 and would increase the throughput of the belt per given revolution.

Figure 5:
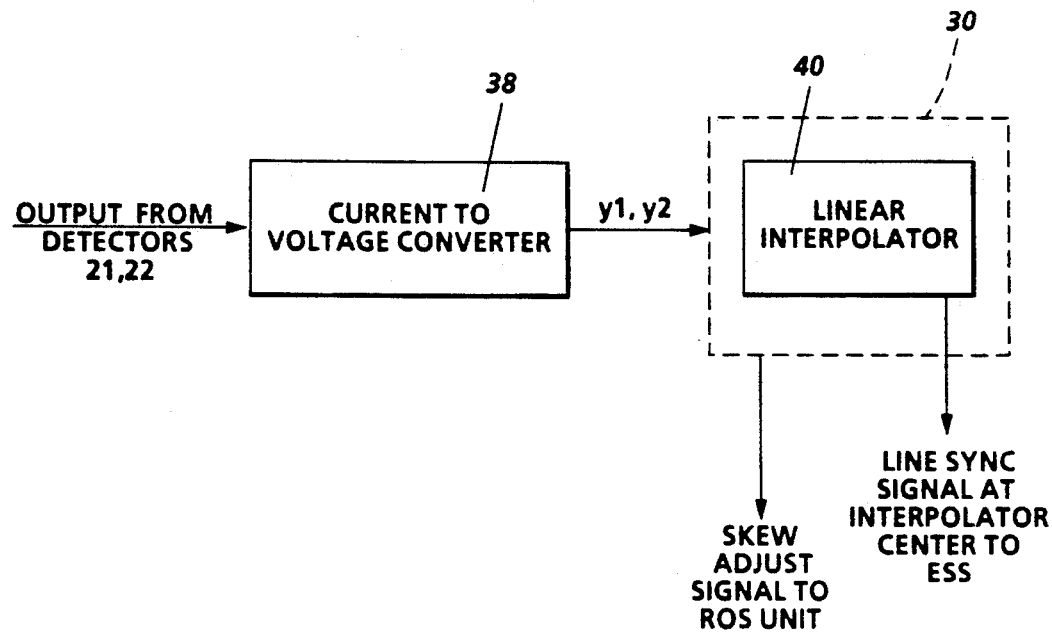
FIG. 5 is a block diagram of the detection and interpolation circuitry.

Determination of the center of the gaussian distribution is difficult because of the "noise" inherent in a ROS scan system. The noise is attributed to asymmetry in beam shape, stray light, variations in the belt hole edge cut and the distance between the belt and the detector. Also factors are variation in the intensity of the laser and wobble of the laser polygon. The present invention is rendered relatively immune to those noise factors by arriving at the center point through an extrapolation method. Referring to FIG. 4, a straight line approximation can be made. The output of detector 21, converted into a voltage level by the circuit shown in FIG. 5, is plotted against time. The data points of interest are the second and third points at time x1 and x2. As shown, the voltage levels are y2 and y1. The interpolated center point, $x_{mid}$, is given by the expression:

$$x_{mid} = (Y_{mid} - b)/m \qquad (1)$$

$$\text{where } m(\text{slope}) = (y2 - y1)/(x2 - x1) \qquad (2)$$

$$\text{and } b = y1 - m(x1) \qquad (3)$$

FIG. 5 shows a block diagram of circuitry which enables the concept. The current output signals from detector 21 are converted to a voltage level at current-to-voltage converter 38 and temporarily stored in linear interpolator circuit 40, a part of ESS 30. Circuit 40 contains timing, comparison and arithmetical circuits for performing the extrapolation set forth by equations 1, 2 and 3, to determine the time at which the center point of the ROS beam is at the lead edge of the belt hole. An offset time is calculated and a line sync signal generated at some time t—offset to initiate the first scan line of each of the image frames.

Figure 6:
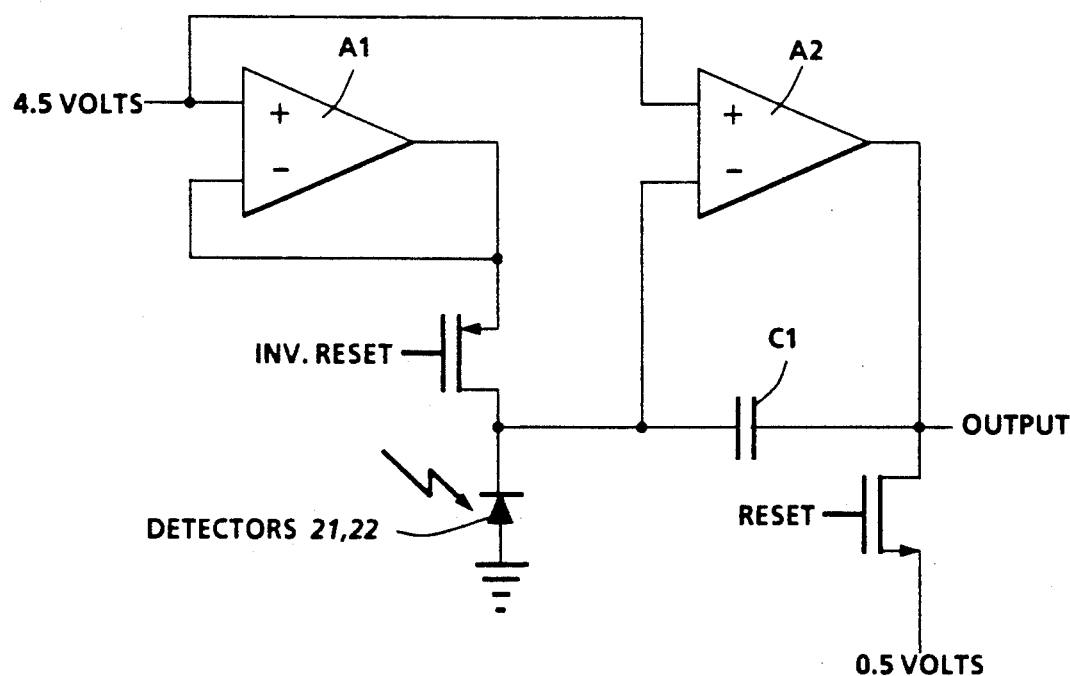
FIGS. 6 and 7 are detailed schematics showing two possible detector current-to-voltage conversion circuits.
Figure 7:
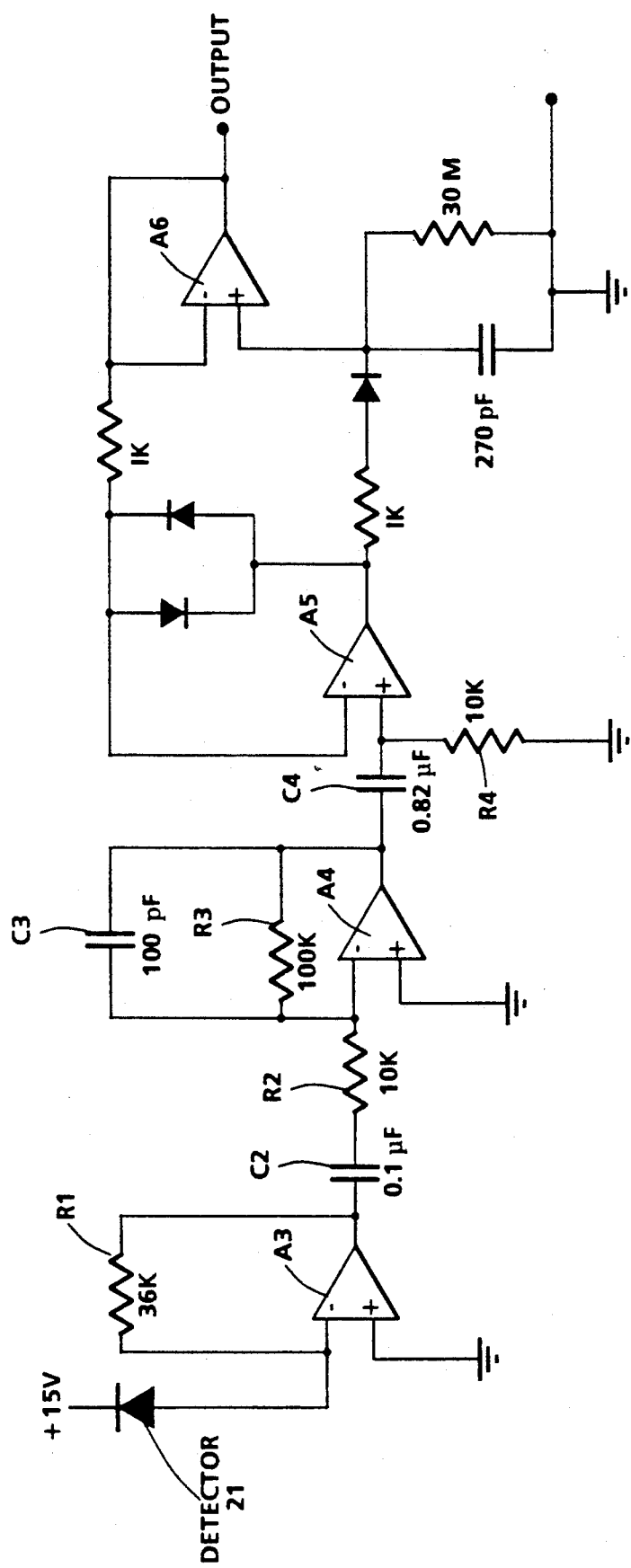

Because of the fast scan time, the time during which the detector is exposed by each beam sweep is in the order of 100–200 nsec, which is too short a period of time for the typical circuit-to-voltage configurations to respond. FIGS. 6 and 7 are schematics of two circuits that can perform the conversion with sufficient speed and accuracy. In FIG. 6, amplifiers A1 and A2 are standard op amplifiers. Capacitor C1 can be sized to give a 4 volt swing for the largest anticipated pulse. The Reset and Inverse Reset are standard 0.5 volt signals from the ESS logic. The voltage on the detector is held constant and, thus, its capacitance is not critical. In FIG. 7, amplifier A3 and resistor R1 provide a current to voltage conversion for the detector current level from detector 21. Capacitor C2 and resistor R2 constitute a high pass filter for the amplified signal. Amplifier A4, capacitor C3 and resistor R3 provide a gain stage and low pass filter operation. Additional high pass filtering is performed by capacitor C4 and resistor R4. Amlifiers A5 and A6 perform the sample and hold function.

While the exemplary embodiment included a plurality of ROS images, the invention can be practiced with other types of devices which scan a modulated beam of light. One such alternative scanner is a holographic scanner, of the type disclosed in U.S. Pat. No. 4,289,371, the disclosure of which is hereby totally incorporated by reference. With this configuration, the rotating polygon is replaced with a rotating holographic diffraction grating. Further, other extrapolation methods besides the straight line approximation may be used. A mean square method consists of estimating the center of the curve, calculating the exposure at each estimated data point, and then calculating the mean square error between the exposure at the estimated locations and the exposure actually generated by the ROS beam. This routine would be repeated recursively until minimum was reached. The accuracy of either method was fairly comparable. For a signal with both normally 10% distributed and 10% uniformly distributed noise, the RMS error of where the midpoint of the gaussian distribution with respect to its true position in the straight line approximation method is 6.5%, while the mean square method RMS error is 6.0% of the full-width half-max. As the noise increases, the percent error of the mean square method becomes proportionally better. The mean square method is more accurate and less sensitive to the amount of noise in the signal, but is also more expensive in terms of computing time. Thus, the appropriate scheme should be chosen, depending upon the application.

While the invention has been described with reference to the structures disclosed, it is not confined to the details set forth, but is intended to cover such modifications or changes as they come within the scope of the following claims.

What is claimed is:

1. An electrophotographic printer of the type having a photoreceptor surface mounted for movement in the process direction, the printer including:
   a plurality of imagers for sequentially scanning and exposing image areas with a scanning beam to form a composite color image thereon,
   a photoreceptor belt mounted for movement in the process direction, said belt having formed therein at least one belt hole having a leading edge which advances with the belt in the process direction,
   detecting means associated with each imager for generating a series of increasing output signals up to a maximum, which correspond to the maximum illumination distribution of the scan beam, each signal produced by a separate scan beam crossing the leading edge of the hole, and
   circuit means for interpolating the detector output signals to determine the time that the ROS beam is at midpoint exposure level at the hole leading edge and for generating a line sync signal based on this reference time.

2. An imaging system for forming multiple image exposure frames on a photoconductive member during a single pass including:
   a photoreceptor belt adapted to accommodate the formation of an integral number of image exposure frames, said belt having at least a first and second hole on opposite sides of the belt width and outside of the exposure frame,
   a plurality of scan line imager units, each imager unit associated with the formation of one of said image exposure frames, each imager forming a plurality of projected scan lines in a fast scan (transverse) direction across the belt width, said scan lines beginning and ending at points outside of the image exposure frame,
   first and second detecting means associated with each of said imagers, said detecting means adapted to sense a series of scan lines crossing the lead edge of said holes and to generate signals representing the increasing exposure levels associated with each successive line crossing, and
   circuit means to determine the center point of said exposure levels, thereby defining the time at which the center of the ROS beam is at the edge of the belt hole.

3. The imaging system of claim 2 wherein said imagers are Raster Output Scanners (ROSs).

4. A method for registering a plurality of images sequentially formed on the surface of a photoreceptor belt, the method comprising the steps of:
   (a) providing an aperture adjacent an edge of the belt adjacent and outside of a first image exposure area,
   (b) providing a plurality of imager stations, each imager station providing sequentially successive scanning beams for exposing an image area associated with a specific color, (c) moving the photoreceptor belt until the leading edge of said belt hole is crossed by a plurality of scanning beams, each beam having a gaussian illumination distribution, (d) detecting the exposure level of each belt hole leading edge crossing and converting each detected current level into a voltage level output, and (e) determining the time at which the gaussian distribution is at a center point.

5. The method of claim 4 further including the step of generating line sync signals using the midpoint time as a reference.

* * * * *